INVENTOR.
PETER H. OHRNBERGER
ATTORNEYS

INVENTOR.
PETER H. OHRNBERGER

United States Patent Office 3,427,015
Patented Feb. 11, 1969

3,427,015
HYDROSTATIC CENTERING DEVICE
Peter H. Ohrnberger, Mount Clemens, Mich., assignor to F. Jos. Lamb Co., Inc., Detroit, Mich, a corporation of Michigan
Filed Jan. 26, 1967, Ser. No. 611,999
U.S. Cl. 269—25
Int. Cl. B23q 3/08; F02b 73/00; F15b 11/20
7 Claims

ABSTRACT OF THE DISCLOSURE

A hydrostatically operated centering and clamping device comprising one or more pairs of opposed pistons arranged in cylinders each of which are provided at their inner ends with an oil recess and a sill and together with an end portion of a piston forms an exhaust passageway of variable cross-section from the recess to drain. When oil under pressure is admitted to the oil recesses, the opposed pair or pairs of pistons will project into engagement with and shift a workpiece until the opposed forces on the workpiece are equal. Thereafter the pistons are locked against axial movement to retain the workpiece in a centered position.

---

This invention relates to a centering device and, more particularly, to a hydrostatically operated device for centering a workpiece in an accurately predetermined position on a fixture or base and clamping the workpiece on the fixture in such position so that it can be operated on by cutting tools or the like which are located in a predetermined position relative to the fixture.

It is an object of the present invention to locate and retain a workpiece, particularly a workpiece which is relatively easily distortable, with a controlled and relatively low clamping pressure by means of a positioning device which is operated by hydrostatic pressure to center the workpiece and thereafter locked in position by a relatively high hydraulic force.

A further object of the invention is to provide a hydrostatic centering device which is highly reliable for accurately locating a workpiece and which is adapted to locate and lock a workpiece in a centered position relatively rapidly.

Other objects and features of the invention will become apparent from the following description and drawings in which.

The hydrostatic centering device of the present invention generally comprises one or more pairs of generally opposed pistons which, when actuated, are arranged to engage a workpiece from opposite sides. The pistons are arranged in cylinders provided at their inner ends with hydrostatic oil recesses and a sill which cooperates with the end portion of the piston to form a relatively small oil exhaust passageway extending from the oil recesses to drain. When oil under pressure is admitted to the oil recesses of the opposed pairs of pistons, the pistons will project into engagement with the workpiece and shift the workpiece until the opposed forces on the workpiece are equal. When the opposed positioning forces on the workpieces are equal, the workpiece is located in the predetermined centered position and the pistons are locked against axial movement to retain the workpiece in the centered position.

Figure 1:
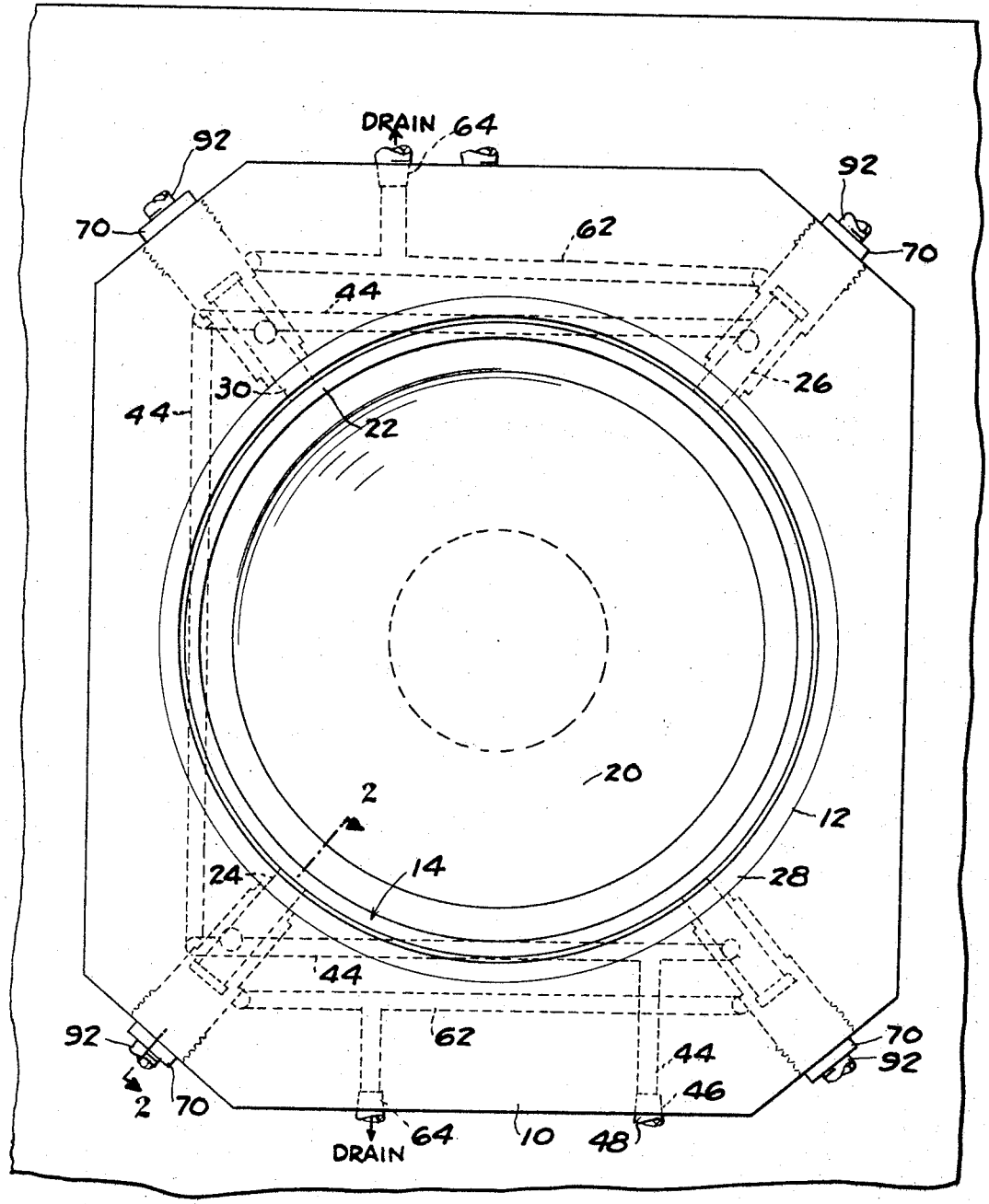
FIGURE 1 is a plan view of the hydrostatic centering device of the present invention.
Figure 2:
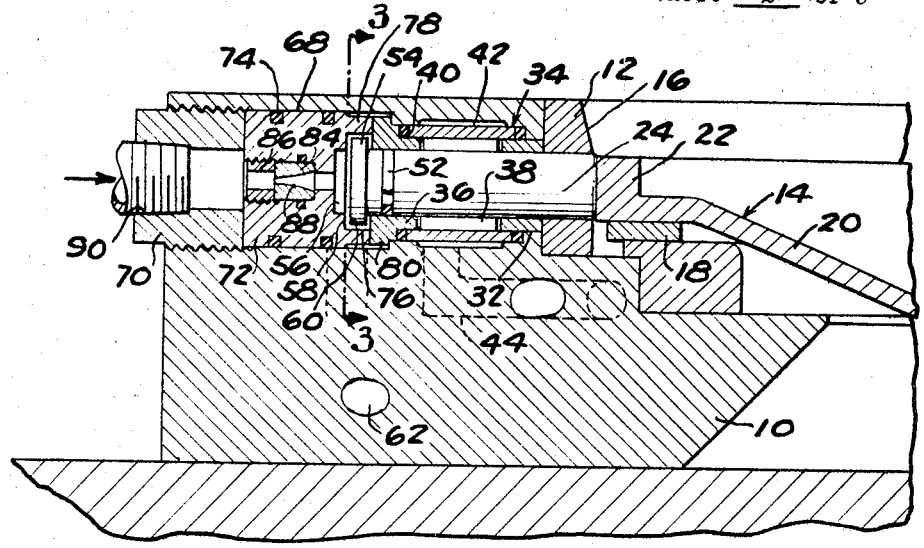
FIGURE 2 is a sectional view along the line 2—2 in FIG. 1.
Figure 3:
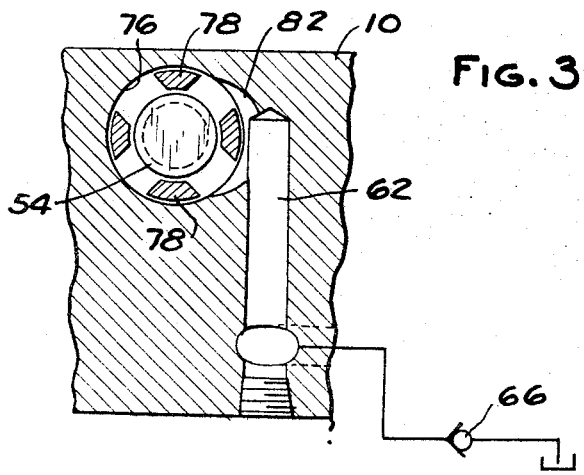
FIGURE 3 is a sectional view along the line 3—3 in FIG. 2.

Referring to FIGS. 1 and 2, the centering device of the present invention includes a base 10 having fixedly mounted thereon a ring 12 within which a workpiece 14 is adapted to be inserted for roughly locating the workpiece on base 10. The inner periphery of ring 12 is chamfered as at 16 to facilitate insertion of workpiece 14 in the fixture. Within the periphery of ring 12 on base 10 there are arranged support pads 18 for supporting the workpiece vertically. The workpiece 14 illustrated comprises a circular shell 20 having an axially extending peripheral flange 22. It will be appreciated, however, as the description proceeds that the centering device of the present invention is not limited for use with symmetrically shaped workpieces. Workpieces of most any shape can be located and clamped in place by the centering device of the present invention. The shape of the workpiece determines the physical design of the centering device. For purposes of illustration the workpiece 14 is shown as a relatively flimsy circular member which is susceptible to distortion if excessive clamping pressure is applied thereto.

The means for applying clamping pressure to the peripheral flange 22 of workpiece 14 in the embodiment illustrated comprises four pistons 24, 26, 28 and 30 which are arranged as two pairs. These pistons are slidably arranged in cylindrical bores 32 in base 10 and project radially inwardly through locating ring 12. Within each bore 32 there is located a hydraulically actuated chuck generally designated 34. Each chuck 34 comprises an inner sleeve 36 which is slotted to form radially flexible pads 38 and an imperforate outer sleeve 40 which extends circumferentially around inner sleeve 36. An annular groove 42 around outer sleeve 40 is connected by a passageway 44 in base 10 to an inlet port 46. A conduit 48 connected with port 46 extends to a hydraulic pressure intensifier generally designated 50. Intensifier 50 is adapted to supply oil under relatively high pressure to the annular grooves 42 extending around sleeves 40 so as to compress sleeves 40 radially inwardly and cause the flexible pads 38 to frictionally grip and lock the pistons against axial movement.

Each piston is sealed within inner sleeve 36 by an O-ring 52 and is formed at its inner end with an enlarged head 54. The inner end of each cylindrical bore 32 is formed with a recess 56 which forms a hydrostatic oil pocket. A sill 58 is formed around each oil pocket 56. The enlarged head 54 of the piston is adapted to seat against sill 58 when retracted completely in its cylinder. However, when the head 54 of the piston is spaced slightly from sill 58, the clearance space therebetween forms an oil exhaust passageway 60 extending from oil pocket 56 to a drain passageway 62. In the embodiment illustrated in FIG. 1 two drain passageways 62 are illustrated. One drain passageway extends between the cylinders for pistons 24 and 28 and the other drain passageway 62 extends between the cylinders for pistons 26 and 30. Drain ports 64 are formed on base 10 for conducting the oil to a sump. Preferably there is arranged in each drain passageway a spring biased check valve 66 so that the passageways 62 will be subjected to a slight back pressure and will not drain freely to sump.

The radially outer end of each bore 32 is enlarged as at 68 to receive a threaded bushing 70 and a spacer 72. Oil pocket 56 and sill 58 are formed in the radially inner end of each spacer 72. Spacers 72 are sealed within bores 32 by O-rings 74. The sill 58 at the radially inner end of each spacer 72 is provided by a shoulder between each oil pocket 56 and an enlarged bore 76 at the end of spacer 72 in which the head 54 of the piston is located. The portion of spacer 72 surrounding bore 76 is formed as a plurality of circumferentially spaced axially extending fingers 78 which are adapted to abut at their free ends against the adjacent end flange 80 of sleeve 36. A slot 82 connects each oil exhaust passageway 60 with its drain passageway 62.

Each spacer 72 is formed with a central bore for receiving an orifice plate 84 and a centrally apertured threaded retainer bushing 86. Each orifice plate 84 has a tapered orifice 88 of predetermined size for producing a predetermined pressure drop between the inlet port 90 and oil pocket 56 of each piston-cylinder assembly. The inlet ports 90 are connected by conduits 92 with a pump 94. Pump 94 is adapted to supply oil under pressure to each of the inlet ports 90. The supply of oil from pump 94 to each cylinder is controlled by a valve 96 which is preferably operated by a solenoid 98.

Figure 4:
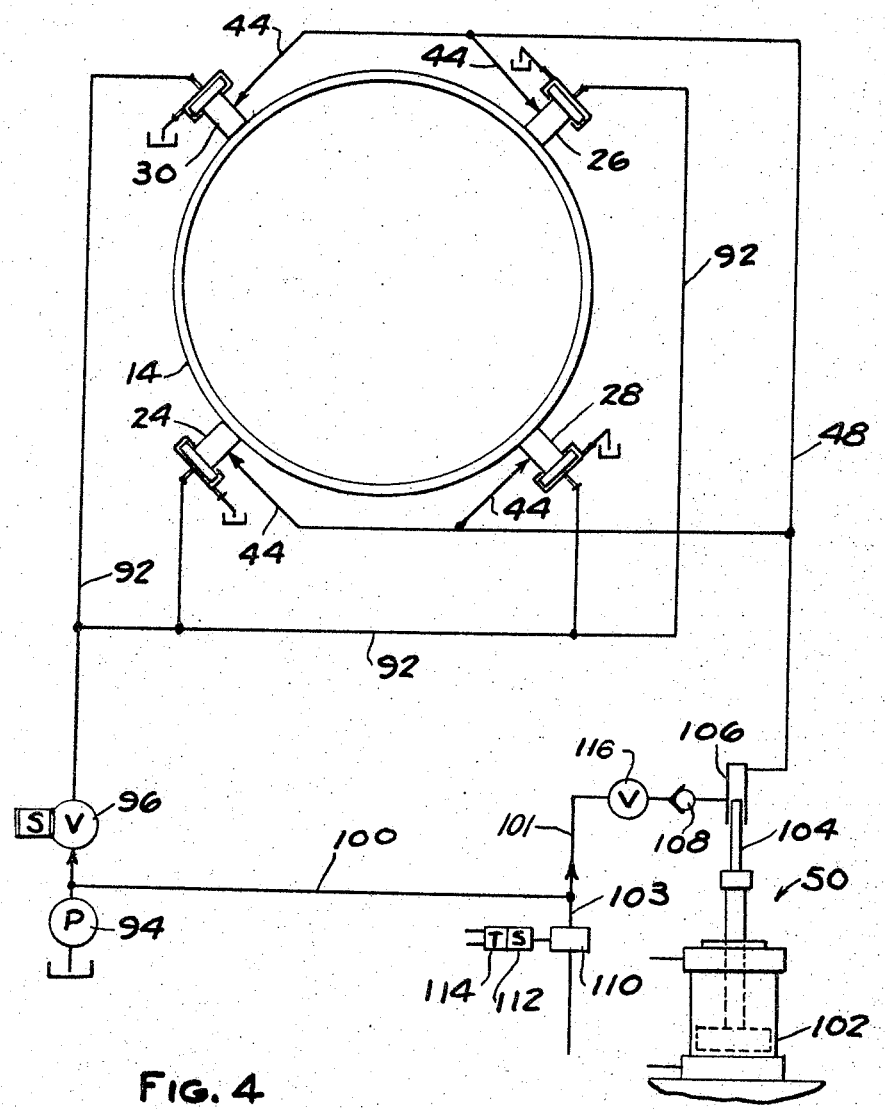
FIGURE 4 is a diagrammatic view of a hydraulic circuit embodying the device.

Pump 94 preferably also supplies oil under pressure to intensifier 50 through a conduit 100 (FIG. 4). Intensifier 50 is of conventional construction and includes a cylinder 102 in which is arranged an intensifier piston 104, the outer end of which operates in an intensifier cylinder 106. Oil to cylinder 106 is supplied through conduit 100 and branch conduit 101 controlled by a check valve 108. Oil to the opposite ends of cylinder 102 is also supplied through conduit 100 and a branch conduit 103 controlled by a four-way valve 110 operated by a solenoid 112. Solenoid 112 is energized by a timer 114 which is in turn energized with solenoid 98 through a switch, not shown. The arrangement is such that timer 114 energizes solenoid 112 to admit oil to the inner end of cylinder 102 after a predetermined time interval has elapsed following the energizing of solenoid 98.

In operation let us assume, merely for the purpose of description, that the orifices 88 and the oil pockets 56 in each of the cylinders are of the same size and that the pistons 24, 26, 28, 30 are also of the same size. Thus, the drop in pressure at each orifice plate 84 will be the same and, when the workpiece 14 is at the predetermined centered position, the gaps behind the heads 54 of the pistons at each of the sills 58 will be of equal size. Thus, the pressure will be the same in each of the oil pockets 56 and the flow through each of the oil exhaust passageways 60 at sills 58 will be the same. This represents the balanced condition of the system. This condition would not normally exist when the workpiece is initially inserted in locating ring 12. Ordinarily when the workpiece is inserted in ring 12 it would be located slightly off center and when pressure is applied at each of the inlet ports 90, the sill clearance behind one piston in each pair would be narrower than the sill clearance at balance condition and the sill clearance behind the opposite piston in each pair would be wider. Since the exhaust passageway from one of the opposed oil pockets 56 would be of greater size than the exhaust passageway from the opposed oil pocket, the pressure in the oil pocket having the smaller exhaust passageway would be higher than in the other oil pocket. Thus the pressures on the two opposed pistons would be unequal. This pressure differential results in a force tending to balance the system which is accomplished when the workpiece is shifted by the opposed pistons to the centered position. Thus if the oil pressure in one of the pockets 56 is greater than in the opposed pocket, the piston subject to the higher pressure will shift the workpiece toward the other piston, thus tending to equalize the pressure and shift the workpiece to the centered position.

This process of shifting the workpiece from the initially located position to the centered position requires a short interval of time and timer 114 is designed to actuate solenoid 112 after the elapse of a predetermined time interval before admitting oil to the inner end of cylinder 102. As the end of piston 104 is shifted into the intensifier cylinder 106, oil under extremely high pressure is admitted to each of the annular grooves 42 in each cylinder bore 32. The high pressure oil deflects the central portion of sleeve 40 inwardly and, therefore, causes the pads 38 to frictionally engage and lock each piston in the position locating the workpiece in the centered position. If the line pressure from pump 94 is higher than the hydraulic chucks 34 are designed for in the free condition, a pressure reducing valve 116 may be located in branch conduit 101.

The purpose of providing a restriction such as 66 from the oil exhaust passageways 60 is to insure that each piston will be projected inwardly into engagement with the workpiece even in the event that the workpiece is undersize. It will be appreciated that if the workpiece is undersize, the clearance gay between the sill 58 and the head 54 of one or more of the pistons will be too great to provide the necessary hydrostatic effect which results only from an extremely small oil exhaust passageway. However, by providing a restriction in the conduit to drain, a back pressure will always be present to assure that the pistons will in any event be projected inwardly into engagement with the workpiece even though the workpiece may be slightly undersize. For this reason, the total clearance between sill 58 and the flanged end 80 of sleeve 36 is substantially greater than the axial dimension of head 54 and thus substantially greater than the sill passageway required to obtain the hydrostatic bearing action. For example, in a system where the line pressure is about 500 lbs. and the oil pocket pressure about 300 lbs., the pistons were designed to apply approximately 60 lbs. of pressure to the workpiece. The total maximum movement of the pistons was about .030" while the maximum sill clearance was only about .0035".

As explained previously, the above description was premised on the assumption that all the oil pockets 56, all the orifices 88 and all the pistons were of the same size. Since the system is balanced when the opposed forces acting on the workpieces are equal, it follows that the system is in the balanced condition when the product of the area of one oil pocket and the pressure therein is equal to the product of the area of the opposed oil pocket and the pressure therein. Thus, regardless of variations in the sizes of the various components and elements, the position of the workpiece in the balanced condition of the system can in any event be determined and this position is considered as the centered position of the workpiece and utilized for locating tooling, etc. relative to the fixture.

It will be appreciated that the invention is not limited to the specific embodiment. For example while it is preferred that the work engaging pistons being arranged in pairs with the pistons in each pair diametrically opposed, a set of three equally angularly spaced pistons could be employed. The expression "opposed pistons" as used in this description and the appended claims is therefore not restricted to diametrically opposed pistons but is used to describe any arrangement wherein two pistons are generally opposed.

Likewise although the oil recesses for exerting pressure on the pistons are illustrated as discrete pockets, it is apparent that the formation of these discrete pockets is not essential. The inlet port or duct can itself serve as the oil cavity, the significant feature being the highly restricted exhaust passageway which imparts to the arrangement the hydrostatic bearing effect.

I claim:

1. A device for locating and clamping a workpiece in an accurately located predetermined position on a support comprising a pair of opposed cylinders on said support, a piston in each cylinder for engaging and locating the workpiece, one end of each cylinder including an oil pocket to which the corresponding end of the piston is exposed and a sill against which a portion of the piston is adapted to bottom, the two pistons being determined in length so that when a properly dimensioned workpiece is engaged by said pistons and located in said predetermined position, a slight clearance space is formed between each sill and said portion of the respective piston, said clearance space providing an oil exhaust passageway from said oil pocket which varies in cross sectional area in response to axial movement of the piston, a source of oil under pressure, a pair of branch conduits connecting said source of oils with each oil pocket for urging each piston into work-engaging position and in a direction to increase the cross sectional area of each exhaust passageway, restricting means in each of said conduits for producing a pressure drop between each oil pocket and said source of oil, said predetermined position of the workpiece on said support being determined by the position assumed by the workpiece when the forces exerted thereon by the two opposed pistons are equal and means for clamping each piston against axial movement for chucking the workpiece in fixed position after it has been located in said predetermined position by said pistons.

2. The combination called for in claim 1 wherein the areas of the two pistons exposed to the oil pockets are substantially the same so that the pressure in each oil pocket and the cross sectional area of each oil exhaust passageway are equal when the workpiece is located in said predetermined position.

3. The combination called for in claim 1 including means for restricting free flow from said oil exhaust passageway to drain.

4. The combination called for in claim 1 wherein said two pistons are diametrically opposed and including a second pair of similar piston-cylinder assemblies aligned transversely of the first pair and connected with said source of oil under pressure so that the two pair of pistons are adapted to locate the workpiece in two directions.

5. The combination called for in claim 1 wherein said means for clamping said pistons against axial movement comprises a radially flexible sleeve extending circumferentially around each piston and hydraulically actuated means for applying a radially inwardly directed pressure against each sleeve for causing the sleeve to frictionally engage the piston.

6. The combination called for in claim 1 wherein the pistons project out one end of the cylinders and the oil pockets are located adjacent the inner ends of the pistons.

7. The combination called for in claim 1 including means for limiting the extent of axial movement of each piston in the work-engaging direction.

References Cited
UNITED STATES PATENTS

| | | | |
|---|---|---|---|
| 2,441,925 | 5/1948 | Wege | 269—25 X |
| 3,203,513 | 8/1965 | Allen | 92—28 X |

ROBERT C. RIORDON, *Primary Examiner.*

J. F. McKEOWN, *Assistant Examiner.*

U.S. Cl. X.R.
60—97; 91—412